United States Patent [19]

Velisavljevic

[11] Patent Number: 4,711,475
[45] Date of Patent: Dec. 8, 1987

[54] HIGH PRESSURE FITTING

[76] Inventor: Dobrila Velisavljevic, 923 S. Jackson, Waukegan, Ill. 60085

[21] Appl. No.: 761,979

[22] Filed: Aug. 2, 1985

[51] Int. Cl.[4] ............................................. F16L 21/04
[52] U.S. Cl. ..................................... 285/348; 285/354
[58] Field of Search ............ 285/348, 354, 356, 332.2, 285/332.3, 357, 353, 24

[56] References Cited

U.S. PATENT DOCUMENTS

| | | | |
|---|---|---|---|
| 546,314 | 9/1895 | Farrey | 285/348 X |
| 1,078,009 | 11/1913 | Taylor | 285/332.2 |
| 1,193,482 | 8/1916 | Parker | 285/356 X |
| 1,309,146 | 7/1919 | Mann | 285/368 |
| 1,715,436 | 6/1929 | Taylor | 285/356 X |
| 3,361,453 | 1/1968 | Brown et al. | 285/348 X |
| 3,986,731 | 10/1976 | DeHoff | 285/356 X |
| 4,174,126 | 11/1979 | Hauff | 285/348 X |

FOREIGN PATENT DOCUMENTS

| | | | |
|---|---|---|---|
| 1509989 | 8/1969 | Fed. Rep. of Germany | 285/354 |
| 406764 | 3/1934 | United Kingdom | 285/353 |
| 2108227 | 5/1983 | United Kingdom | 285/353 |

*Primary Examiner*—Thomas F. Callaghan
*Attorney, Agent, or Firm*—Wood, Dalton, Phillips, Mason & Rowe

[57] ABSTRACT

A coupling including a first sleeve having an exterior surface provided with an annular, frusto-conical surface and a second sleeve of larger diameter than the first sleeve and having an annular, interior frusto-conical surface, the second sleeve being disposed about the first sleeve. Interengaging elements align the frusto-conical surfaces to define a generally V-shaped annular, axially opening groove between the sleeves and an O-ring seal is disposed in such groove and abuts both the frusto-conical surfaces. A compressing ring engages the O-ring seal oppositely of the frusto-conical surfaces to drive the O-ring into sealing engagement therewith.

1 Claim, 4 Drawing Figures

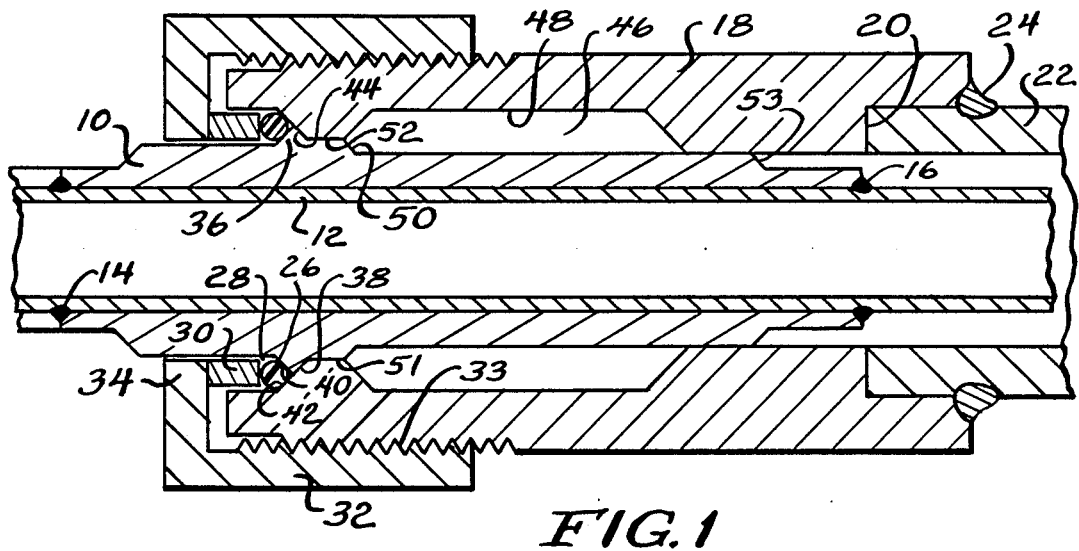

HIGH PRESSURE FITTING

FIELD OF THE INVENTION

This invention relates to a fitting, and more specifically, to a fitting that may be utilized in systems subject to high fluid pressures.

BACKGROUND OF THE INVENTION

There currently exist a large variety of fittings for use in fluid systems such as hydraulic systems or the like. Many are so-called compression fittings and typically employ a ferrule, which, together with a nut, are disposed on a tube or conduit near an end thereof. An externally threaded sleeve is engaged with the nut, and as the latter is tightened, the ferrule is compressed and slightly deformed into sealing engagement with the tube as well as a surface within the sleeve. There are, of course, a great variety of compression fittings operating on this basic theme, and in general, they work very well for their intended purpose. However, in high pressure applications, difficulty in their use is observed. Similarly, when used in applications requiring occasional or frequent disassembly, they may result in leaky joints.

In particular, if the tube on which the ferrule is receives is too rigid, some difficulty may be be experience in sealing the interface between the tube and the ferrule.

Furthermore, the same can be over or under tightened, depending upon the assembler. In the case of the former, upon disassembly of the joint and reassembly thereof, a difficulty may be experienced in resealing the joint. In the case of the latter, an initial seal may not be obtained.

Frequently, joints of this sort, or joints employing packing may be utilized to seal the interface of a tube of relatively small diameter placed nominally concentrically within a tube of larger diameter. For example, a small diameter tube maybe a so-called "thimble" which receives a sensor which is to be disposed within the larger tube to sense, for example, temperature differences in a fluid in fluid communication with the interior of the larger tube. In some instances, the smaller tube may be part of an electrical heating element or the like. In these instances, the periodic disassembly or maintenance or the like is required, it is highly desirable to provide a reusable fitting having excellent sealing characteristics so as to avoid the difficulties that may occur in the reuse of so-called compression fittings. To avoid the difficulties associated with such fittings, the use of seal rings and flanged couplings have been proposed as well as other forms of packing, including O-rings. However, flanged couplings are difficult to disassemble and reassemble, particularly when one coupling element mounts a thimble. Conventional O-ring configurations are not known to be adapted for concentric tube assemblies in such a fashion that the components may be readily serviced and reused.

Thus, there is a real need for a new and improved fitting that avoids the difficulties encountered with the use of compression fittings, is capable of use in high pressure systems without leakage, and which is easily installed and subsequently serviced.

SUMMARY OF THE INVENTION

It is the principal object of the invention to provide a new and improved fitting. More specifically, it is an object of the invention to provide a fitting that satisfies one or more of the above stated needs.

An exemplary embodiment of the invention achieves the foregoing object in a fitting including a first sleeve having an exterior provided with an annular, frusto-conical surface. The fitting also includes a second sleeve of a larger diameter than the first sleeve. The second sleeve has an annular, interior, frusto-conical surface and is disposed about the first sleeve. Means are provided on the sleeves for axially aligning the frusto-conical surfaces to define a split, generally V-shaped, annular, axially opening groove between the sleeves. An O-ring seal is disposed in such groove so as to abut both of the frusto-conical surfaces and means are provided for compressing the O-ring seal against such surfaces in good sealing contact therewith.

As a consequence of this construction, a high pressure seal is provided which may be utilized with all the ease of conventional compression fittings but yet may be assembled and disassembled without incurring leakage problems. The seal is also susceptible to easy manipulation during assembly and disassembly.

In the one embodiment of the invention, the first sleeve is adapted to be disposed on a first tube and sealed thereagainst, while the second sleeve is adapted to be disposed in sealed relation on a second tube of larger diameter than the first tube. Compression of the O-ring seal is achieved by a compressing ring engaging the O-ring seal oppositely of the frusto-conical surfaces. A nut may be threaded onto the second sleeve to engage the compressing ring oppositely of the O-ring seal and is rotatable to apply an axially directed force to the compressing ring to urge the O-ring seal into the V-shaped groove and the sealing contact mentioned previously.

In a preferred embodiment of the invention, the radial aligning means comprise a continuation of one of the frusto-conical surfaces and a further frusto-conical surface on the one of the sleeves not having the continuation. The further frusto-conical surface matingly engages the continuation to provide the desired axial alignment.

The invention contemplates that such continuation be on the second sleeve and that the further frusto-conical surface be on the first sleeve immediately adjacent the annular frusto-conical surface thereon and in oppositely facing relation thereto.

According to another embodiment of the invention, the mating frusto-conical surfaces may be located axially remote from the annular frusto-conical surfaces.

The invention also contemplates that the sleeves be constructed so as to define an elongated, annular space at their interface along a portion of their length. As a consequence, any corrosion or foreign material entering the interface of the two sleeves is unlikely to bond the sleeves together to enhance ease of disassembly.

Other objects and advantages will become apparent from the following specification taken in connection with the accompanying drawings.

DESCRIPTION OF THE DRAWINGS

FIG. 1 is a sectional view of the preferred embodiment of a fitting made according to the invention;

FIG. 2 is an enlarged, fragmentary view of a seal;

FIG. 3 is a sectional view of a modified embodiment of the fitting; and

FIG. 4 is a view similar to FIG. 2 but of the modified embodiment.

DESCRIPTION OF THE PREFERRED EMBODIMENT

Exemplary embodiments of a fitting made according to the invention are illustrated in the drawings and with reference to FIG. 1, a first embodiment of the same is seen to include an elongated sleeve 10 which may be disposed about a tube 12. The sleeve 10 preferably is formed of a material of sufficient strength and sized so as not to deform when the fitting is assembled. The tube 12 may be simply a conduit for fluid or a so-called thimble for slidable receipt of a sensor or the like, or even the exterior sheathing on a heating element, depending upon the system in which the fitting is to be employed. As illustrated in FIG. 1, at its opposite ends, the sleeve 10 is sealed to the tube 12 as by welds 14 and 16, but those skilled in the art will appreciate that other sealing and/or mounting schemes can be employed with efficacy, again depending upon requirements of the system in which the fitting is to be employed.

The fitting also includes a second sleeve 18 having a shouldered recess 20 at one end for receipt of the end of a tube 22. As is apparent from FIG. 1, the sleeve 18 is of larger diameter than the sleeve 10 and receive the same in generally concentric relation. In this connection, the tube 22 is of larger diameter than the tube 12 and likewise receives the tube 12 in nominally concentric relation. The tube 22 may be sealed and secured to the sleeve 18 as by welding shown at 24 although, again, those skilled in the art will appreciate that other sealing and/or mounting schemes, as, for example, threads can be employed.

To seal the interface of the sleeves 10 and 18, a conventional, elastomeric or metallic O-ring 26 is employed. The O-ring 26 is disposed in an axially opening, split, generally V-shaped grooved 28 to be described in greater detail hereinafter. The O-ring 26 is compressed into sealing relation with the bottom of the groove 28 to seal the interface between the sleeves 10 and 18 by means of a compressing ring 30 which abuts the O-ring 26 oppositely of the bottom of the groove 28. An axial force may be applied to the compressing ring 30 to compress the O-ring 26 by means of a nut 32 threaded as at 33 to the exterior of the sleeve 18. The nut 32 has a radially inwardly directed flange 34 for engagement with the compressing ring 30 oppositely of the O-ring seal 26.

Returning to the groove 28, as best seen in FIG. 2, the sleeve 10 has an annular, radially outwardly directed ridge 36 defined by a first, annular frusto-conical surface 38 and a second oppositely facing frusto-conical surface 40. The two frusto-conical surfaces 38 and 40 are in immediate adjacency to each other to define the ridge 36.

On its interior, the sleeve 18 includes an annular frusto-conical surface 42, the radially outer portion of which, together with the second frusto-conical surface 40 define the bottom of the split V-shaped groove 28 and sealing surfaces against which the O-ring seal 28 sealingly abuts to be compressed thereagainst by operation of the compressing ring 30 and the nut 32.

A radially inward portion 44 of the interior frusto-conical surface 42, that is, a radially inwardly directed continuation thereof, is configured to mate with the first frusto-conical surface 38 and act as a positioning shoulder whereby the frusto-conical surfaces 40 and 42 are aligned in the axial direction.

The angle between the second frusto-conical surface 40 and the interior frusto-conical surface 42 is not particularly critical. A 90° angle will work well. It is, however, important that the angle not be so small that the O-ring 26 can wedge between the surfaces 40 and 42, making removal difficult.

As seen in FIG. 1, both of the sleeves 10 and 18 are relatively axially elongated. In some instances, such a degree of elongation is not required but generally will be employed in those systems where good concentricity of the components is required to achieve extremely reliable sealing under high pressure.

FIG. 1 also illustrates the provision of an annular, elongated space 46 at the interface of the sleeves 10 and 18. The space 46 extends over a substantial portion of the axial length of the sleeves 10 and 18 and is provided so that foreign material entering the interface, or corrosion occurring thereat, will not act to bond the sleeves 10 and 18 together to thereby ease the disassembly process should it be necessary to disassemble the fitting. As shown in FIG. 1, the space 46 is defined by a radially inwardly opening annular groove 48 on the interior of the sleeve 18 and a radially outwardly opening step 50 on the exterior surface of the sleeve 10. Preferably, the step 50 is frusto-conical, faces the same axial direction as the first frusto-conical surface 58 and merges therewith via a cylindrical surface 51 which closely nests within an interior cylindrical section 52 on the sleeve 18. Thus, the step 50 and surfaces 51 and 52 serve to pilot and locate the sleeve 10 within the sleeve 18.

If desired, a tapered surface 53 may be located on the sleeve 10 adjacent or at the end thereof that is first disposed within the sleeve 18 during assembly to facilitate entry of the sleeve 10 into the sleeve 18.

A modified embodiment is illustrated in FIGS. 3 and 4 and where like components are employed, they are given the same reference numerals mentioned previously and will not be redescribed in the interest of brevity.

In this embodiment, the ridge 36 and the first frusto-conical surface 38 on the sleeve 10 are dispensed with. However, the second frusto-conical surface 40 is retained along with the step 50 and piloting surfaces 51 and 52. Also in this embodiment, the radially outer portion of the frusto-conical surface 42 is retained, but the continuation 44 is omitted. Thus, the O-ring seal 26 may be compressed against the surfaces 40 and 42 to provide excellent sealing in the same fashion alluded to generally previously.

To achieve proper alignment of the surfaces 40 and 42, at ends of the sleeves 10 and 18 remote from the O-ring seal 26, mating frusto-conical surfaces are provided. For example, on the sleeve 10, there is a frusto-conical surface 54 which faces oppositely of the frusto-conical surface 40. It is to be noted that the radially inner portion of the frusto-conical surface 54 may serve the same purpose as the taper 52 in the embodiment shown in FIG. 1.

The sleeve 18 is provided with a frusto-conical surface 56 which engages the radially outer portion of the frusto-conical surface 54 for aligning purposes in the same manner generally mentioned previously.

A space 58 at the interface between the sleeves 10 and 18 is likewise provided for the same purpose as the space 46.

The embodiment of the invention illustrated in FIG. 1 and 2 is preferred in that the unique configuration of the frusto-conical surfaces 38, 40 and 42 along with the continuation 44 is such that the surfaces 40 and 42 will always be properly axially aligned to assure excellent sealing. However, in some instances, the relative axial thinness of the ridge 36 which defines the surfaces 38 and 40 may be such as to provide insufficient rigidity to resist deformation as a result of large clamping forces applied by the nut 32. In such a case, the embodiment of FIGS. 3 and 4 may be utilized so long as care is taken in locating the surfaces 54 and 56 properly as to assure the desired axial alignment of the surfaces 40 and 42.

It will also be appreciated that the invention is susceptible to use in constructions other than those illustrated in the drawings. For example, the sleeve 18 may be integral with a tube 22 or may even form part of a housing as, for example, that part of the housing in a valve surrounding the stem opening. In such a case, the seal configuration including the O-ring 26 will replace conventional valve packing.

The fitting of the invention is easily installed, the installation operation being much like that utilized in installing conventional compression fittings. At the same time, because permanent deformation of ferrules or tubes, or both is not involved, over or under tightening problems are eliminated. The same lack of deformation of components permits ready reuse or all components including the tubes to which the fitting is attached. At most, occasional replacement of the O-ring 26 may be required. However, because the fitting construction provides easy access to the O-ring 26, removal and replacement of the same without full removal of, for example, the thimble 12 from the tube 22 (which may involve removal of literally several hundreds of feet of thimble in, for example, nuclear installations) is easily accomplished since generally in such instances, the length of the thimble external of the fitting oppositely of the tube will be quite short, normally only a few inches. In this type of installation, the fitting serves to provide ease of maintenance without damage to system components as, for example, the thimble.

Furthermore because of the ease of replacement of the O-ring, even where such is required, sealing difficulties upon reassembly after disassembly for service or the like, are completely avoided. Moreover, the fitting may be used in high pressure environments without fear of leakage since the O-ring 26 may be compressed as much as desired to achieve the necessary sealing for any given system by appropriate rotation of the nut 32.

Finally, it will be appreciated that assembly and disassembly of the fitting is considerably simpler than when dealing with a flange type coupling.

I claim:

1. A coupling comprising:
    a first sleeve adapted to be disposed on a first tube and sealed thereagainst, said sleeve having an extertior surface provided with an annular frusto-conical surface;
    a second sleeve of larger diameter than said first sleeve and adapted to be disposed in sealed relation on a second tube of larger diameter than said first tube and nominally concentric thereabout, said second sleeve having an annular interior frusto-conical surface and being disposed about said first sleeve;
    mating frusto-conical surfaces on said sleeves axially remote from said annular frusto-conical surfaces for axially aligning said annular frusto-conical surfaces to define a split, generally V-shaped annular, axially opening groove between said sleeves;
    an O-ring seal in said groove and abutting both of said annular frusto-conical surfaces;
    a compressing ring engaging said O-ring seal oppositely of said annular frusto-conical surfaces; and
    a nut threaded to said second sleeve and engaging said compressing ring oppositely of said O-ring seal and rotatable to apply an axially directed force to said compressing ring to urge said O-ring seal into said V-shaped groove and sealing contact with both of said annular frusto-conical surfaces.

* * * * *